United States Patent [19]

Bastacky

[11] 3,755,102

[45] Aug. 28, 1973

[54] PROCESS FOR TREATING INDUSTRIAL WASTES

[76] Inventor: Simon Bastacky, 6604 Dalzell Pl., Pittsburgh, Pa. 15217

[22] Filed: Mar. 20, 1970

[21] Appl. No.: 21,377

[52] U.S. Cl. .................. 204/92, 204/93, 204/267
[51] Int. Cl. ........ C01g 1/02, C01g 1/10, B01k 3/06
[58] Field of Search ............... 23/126, 200; 204/92, 204/93

[56] References Cited
UNITED STATES PATENTS

| 1,348,462 | 8/1920 | Weaver et al. | 23/200 |
| 2,005,120 | 6/1935 | Whetzel et al. | 23/126 |
| 2,143,805 | 1/1939 | Smith | 23/126 |
| 1,308,040 | 7/1919 | Chubb | 159/DIG. 1 |
| 2,202,414 | 5/1940 | Barnes et al. | 23/200 X |
| 2,272,345 | 2/1942 | Kobe | 159/DIG. 1 |
| 2,292,483 | 8/1942 | Powell | 159/DIG. 1 |

OTHER PUBLICATIONS

Modern Electroplating by Lowenheim pp. 6, published by Electrochemical Soc., Inc., (John Wiley N.Y.) 1963.

Primary Examiner—F. C. Edmundson
Attorney—Webb, Burden, Robinson and Webb

[57] ABSTRACT

A process for treating industrial wastes containing sulphuric acid and metal constituents comprising subjecting the wastes to a cell equipped with a plurality of alternately positioned positive and negative aluminum electrodes and charging the electrodes. A solid residue forms which can be further reduced by an ignition step. The aluminum electrodes are one of, or a combination of, rows of pipe, flat plates, or corrugated plates.

7 Claims, 4 Drawing Figures

INVENTOR.
SIMON BASTACKY
BY Webb Burden
Robinson & Webb

PROCESS FOR TREATING INDUSTRIAL WASTES

My invention relates to a process for treating industrial wastes and, more particularly, to a process for reducing spent sulphuric acid wastes containing metal constituents to a solid residue.

Modern-day ecologists are raising the cry of environmental pollution with considerable emphasis on the pollution of our water resources. A major pollutant of our water resources are the industrial wastes which result from employing sulphuric acid to treat various products. For example, a concentrated sulphuric acid pickle bath for steel processing soon loses its effectiveness and must be continually replaced and/or replenished with fresh acid. The used acid, termed "spent pickle liquor" is directly or indirectly disposed of in our streams, rivers, and lakes.

Various forms of evaporators, condensators, diluters, and neutralizers have been employed on these industrial wastes, but the effectiveness of these processes is, at best, minimal for the pollution continues at a record pace.

My invention eliminates this aspect of pollution of our water resources by reducing the wastes to a solid residue. My invention employs simple, yet efficient means for reducing these wastes to a solid residue. My invention also permits the reclamation of a metal where a metal was removed in the industrial process. My invention is amenable to a batch-type operation or a continuous-type operation, whichever is preferred.

My invention is a process for treating spent sulphuric acid industrial wastes by a combination of evaporation and electrolysis. The wastes are treated in cells having a plurality of alternately positioned positive and negative aluminum electrodes. The electrodes can be plate form, corrugated sheet form, pipe form or a combination thereof. Direct current is applied and the polarity of the electrodes can be changed to preserve the electrodes. A solid residue forms which can be further reduced by an ignition step and the metal removed by cleaning or pickling can be reclaimed.

In the accompanying drawings, I have shown my presently preferred embodiment of my invention in which.

My invention has general application to the treatment of industrial waste containing sulphuric acid and specific application to the pickling or cleaning of metals with sulphuric acid. The general application of my invention is in areas such as industrial mine wastes and wood pulp processing wastes where sulphuric acid is employed or is present. The specific application is in the area of metal processing and, therefore, for purposes of illustration, I will describe the invention in respect of "spent pickle liquor," which is the result of pickling steel in sulphuric acid. Such a "spent pickle liquor" contains as major constituents in general between 5 and 15 percent sulphuric acid, 3 – 5 percent iron, and the balance primarily water, with other incidental impurities.

I have found that subjecting these spent pickle liquors to aluminum electrodes results in a combination of evaporation and electrolysis which forms a solid residue, thereby eliminating or altering all the liquid constituents.

My process is carried out in insulated containers referred to as cells. These cells are filled with a spent pickle liquor. A plurality of alternately positioned positive and negative aluminum electrodes are positioned in the cell much in the same way as a storage battery is constructed.

The shape and number of the electrodes are very important in that the process combines both electrolysis and evaporation and, therefore, an increase in surface area of the electrodes increases the overall speed of the process.

Figure 1:
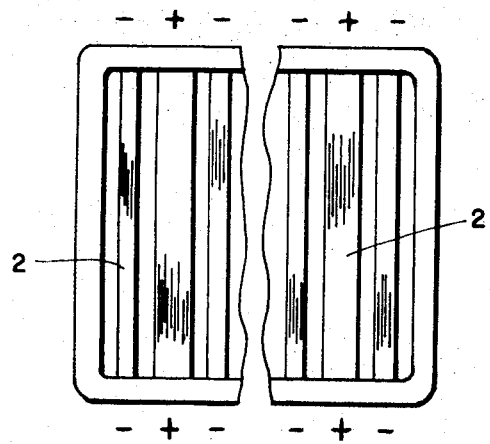
FIG. 1 is a plan view of a cell containing flat plate aluminum electrodes.
Figure 2:
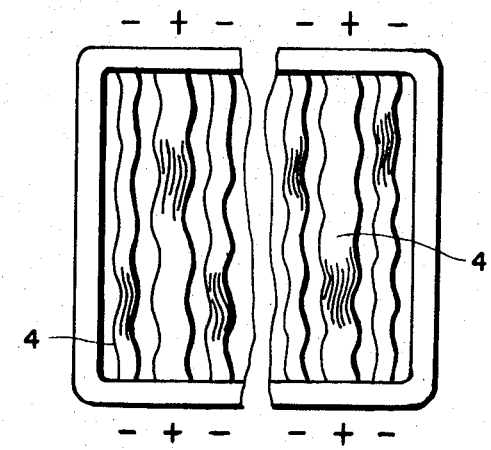
FIG. 2 is a plan view of a cell containing corrugated plate aluminum electrodes.
Figure 3:
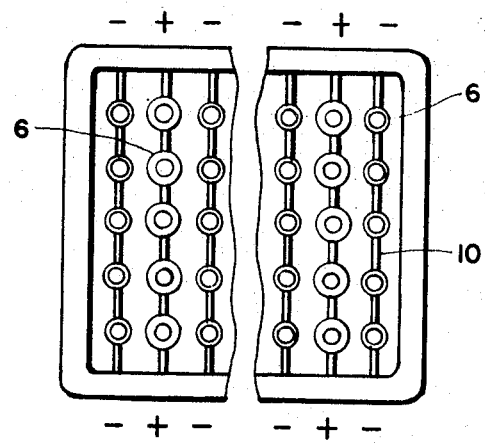
FIG. 3 is a plan view of a cell containing a plurality of pipes in rows as the aluminum electrodes.
Figure 4:
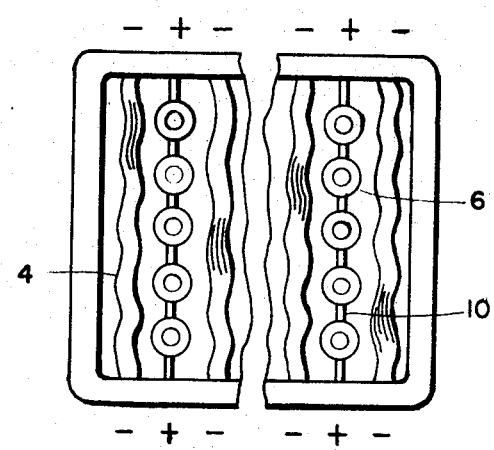
FIG. 4 is a plan view of a cell containing rows of pipes as the positive aluminum electrodes and corrugated sheets as the negative electrodes.

Since electrolysis is involved it is necessary to have the positive electrode thicker than the negative electrode, see FIGS. 1 – 4. These electrodes may be in the form of plates, either flat 2 or corrugated 4 to increase the surface area, see FIGS. 1 and 2, respectively. These electrodes may also be rows of aluminum pipes 6 wherein each row contains a plurality of pipes 6 connected by a metal bar 10, see FIG. 3. These pipes 6, which terminate above the bottom of the cell, increase the amount of evaporation present since the spent pickle liquor engulfed within the pipe rapidly evaporates and is replaced by additional liquid which enters through the bottom of the pipe. These various forms of electrodes can also be used in combination. For example, rows of aluminum pipes 6 may be used as the positive electrode and a corrugated plate 4 may be used as the negative electrode, see FIG. 4.

A suitable arrangement to carry out my process is as follows. A group of rubber cases divided into 6 cells each is employed. A plurality of aluminum electrodes are placed in each cell. These electrodes are alternately positioned positive and negative and are connected to a charger which will supply direct current, generally through a rectifier. A normal theoretical cell requires 2 volts, but to allow for the efficiency of the operation, I employ about 2-½ volts per cell or 15 to 20 volts per case. Therefore, a normal 3 phase, 220 volt line will handle about 30 to 36 cases.

To start the process after the case is filled with spent pickle liquor, one merely charges the electrodes. Initially, for gallon cells, 40 to 50 amps per line are required, but as the evaporation and electrolysis takes place and the water is driven off, the amperage can be progressively decreased. An alternative is to merely replenish the depleted spent pickle liquor with additional spent pickle liquor to be processed.

The electrodes build up heat as a resistant heater while, at the same time, electrolysis is taking place which also adds to the heat input. As the process continues and the liquid components are driven off or broken down, a solid residue of ferrous sulphate forms in the bottom of the case. The residue continues to accumulate until there is very little visible liquid remaining. At this point the power is cut and the residue, which is substantially in solid form, is allowed to cool. Upon cooling, further solidification takes place and a totally solid residue remains. The cells can then be dumped and used again.

A typical sample of this residue after treatment of a spent pickle liquor normally having about 13 percent sulphuric acid, 3 – 5 percent iron and 84 percent water analyzed as follows:

| | |
|---|---|
| Iron as $Fe_2O_3$ | 34% by weight |
| Al as $Al_2O_3$ | 2.8% by weight |
| Sulphuric Anhydride, $SO_3$ | 45.3% by weight |

Approximately 85 percent by weight of the starting material was removed, so for every 100 pounds of spent pickle liquor there is 15 pounds of residue.

An additional step can be added to the process and this is ignition of the residue. The residue can be placed in a furnace and ignited to drive off and break down further the remaining constituents. The particular sample which was analyzed above was ignited at 750° C and had a further 63 percent loss in weight.

Other samples of residue have been treated at 1,000° F for 1 hour and thereafter at 750° C for 1 hour with the result that 57.8 percent of the starting residue, before ignition, was reclaimed as $Fe_2O_3$. Therefore, the ignition step or steps permit the recovery of the iron which was removed in the first instance.

Economically speaking, it may be advantageous to use relatively small cells which can operate at low amperage. Large cells take more amperage which requires very heavy and sometimes complex equipment to transmit the electricity.

The ferrous sulphate residue can be collected immediately when the process is used in batch form or can be left to accumulate in the cases where a more continuous operation is employed, such as where depleted spent pickle liquor is constantly replenished in the cells.

I have thus found that spent pickle liquor from the pickling of steel by sulphuric acid can be reduced to a solid ferrous sulphate residue by subjecting the spent pickle liquor to my process in which I employ a plurality of aluminum electrodes which, by a combination of evaporation and electrolysis, reduces the material to a solid residue. This solid residue of ferrous sulphate can be further reduced by an ignition step or steps to reclaim a substantial amount of the metal in the residue.

I claim:

1. A process for treating spent pickle liquor obtained from the pickling of steel in a sulphuric acid bath comprising subjecting the pickle liquors to a cell equipped with a plurality of alternately positioned positive and negative aluminum electrodes and charging said electrodes with about 2.5 volts per cell, whereby the liquid portion is dissipated and a ferrous sulphate residue forms.

2. The process of claim 1 including terminating the charging and cooling the ferrous sulphate.

3. The process of claim 1 wherein the aluminum electrodes are one of or a combination of rows of connected pipe, flat plates or corrugated plates.

4. The process of claim 1 including transferring the ferrous sulphate residue to an ignition furnace and igniting the ferrous sulphur residue to further reduce the weight of the residue.

5. The process of claim 1 including reclaiming the Fe as $Fe_2O_3$.

6. The process of claim 4 wherein the ferrous sulphate residue is subjected to a temperature of about 750° C.

7. The process of claim 6 including directing 40 to 50 amps to each cell and subsequently gradually reducing the amperage as the pickle liquor is dissipated.

* * * * *

UNITED STATES PATENT OFFICE
CERTIFICATE OF CORRECTION

Patent No. 3,755,102          Dated August 28, 1973

Inventor(s)  Simon Bastacky

It is certified that error appears in the above-identified patent and that said Letters Patent are hereby corrected as shown below:

Column 1 Line 34 --in-- should be inserted after --be--.
Claim 7 - Column 4 Line 31 --claim 6-- should read --claim 1--.

Signed and sealed this 1st day of January 1974.

(SEAL)
Attest:

EDWARD M. FLETCHER, JR.
Attesting Officer

RENE D. TEGTMEYER
Acting Commissioner of Patents